(12) United States Patent
Xing et al.

(10) Patent No.: US 11,845,843 B2
(45) Date of Patent: Dec. 19, 2023

(54) CONDUCTIVE SILK FIBROIN MATERIAL, AND PREPARATION METHOD AND USE THEREOF

(71) Applicants: NANTONG TEXTILE & SILK INDUSTRIAL TECHNOLOGY RESEARCH INSTITUTE, Nantong (CN); SOOCHOW UNIVERSITY, Suzhou (CN)

(72) Inventors: Tieling Xing, Nantong (CN); Juntao Zhao, Nantong (CN); Shenzhou Lu, Nantong (CN); Yirong Wang, Nantong (CN); Shuqing Lu, Nantong (CN); Guoqiang Chen, Nantong (CN); Chuchu Lin, Nantong (CN)

(73) Assignees: NANTONG TEXTILE AND SILK INDUSTRIAL TECHNOLOGY RESEARCH INSTITUTE, Nantong (CN); SOOCHOW UNIVERSITY, Suzhou (CN)

( * ) Notice: Subject to any disclaimer, the term of this patent is extended or adjusted under 35 U.S.C. 154(b) by 387 days.

(21) Appl. No.: 17/265,689

(22) PCT Filed: Mar. 24, 2020

(86) PCT No.: PCT/CN2020/080876
§ 371 (c)(1),
(2) Date: Feb. 3, 2021

(87) PCT Pub. No.: WO2021/142933
PCT Pub. Date: Jul. 22, 2021

(65) Prior Publication Data
US 2022/0112347 A1    Apr. 14, 2022

(30) Foreign Application Priority Data
Jan. 13, 2020    (CN) .......................... 202010032403.X

(51) Int. Cl.
C08G 63/42    (2006.01)
C08J 7/16    (2006.01)
C08J 5/18    (2006.01)
C08J 7/14    (2006.01)
H01B 1/12    (2006.01)

(52) U.S. Cl.
CPC .  *C08J 7/16* (2013.01); *C08J 5/18* (2013.01); *C08J 7/14* (2013.01); *H01B 1/12* (2013.01); *C08J 2389/00* (2013.01)

(58) Field of Classification Search
USPC ........................................................ 428/419
See application file for complete search history.

(56) References Cited

U.S. PATENT DOCUMENTS

2017/0296079 A1    10/2017    Torimitsu

FOREIGN PATENT DOCUMENTS

| CN | 106046390 A | 10/2016 |
| CN | 108517571 A | 9/2018 |
| CN | 109912824 A | 6/2019 |

OTHER PUBLICATIONS

Y Wang 2009 J. Phys.: Conf. Ser. 152 012023 (Year: 2009).*

* cited by examiner

*Primary Examiner* — Terressa Boykin
(74) *Attorney, Agent, or Firm* — SZDC Law PC

(57) ABSTRACT

The present invention provides a method for preparing a conductive silk fibroin material, comprising the steps of: (1) preparation of a high-molecular-weight silk fibroin solution; (2) preparation of an insoluble silk fibroin material; (3) surface treatment of the silk fibroin material; (4) oxidation of the silk fibroin material; and (5) in-situ oxidative polymerization of 3,4-ethylenedioxythiophene on the surface of the graft-modified silk fibroin material. In the present invention, a conductive composite film grafted with 3,4-ethylenedioxythiophene on the surface is prepared, and the surface resistance is 100 to 5000 ohms. The preparation process is simple and mild, and the obtained conductive silk fibroin material can be used as a flexible electronic device, especially as a device for measuring human blood glucose level and heartbeat.

8 Claims, 1 Drawing Sheet

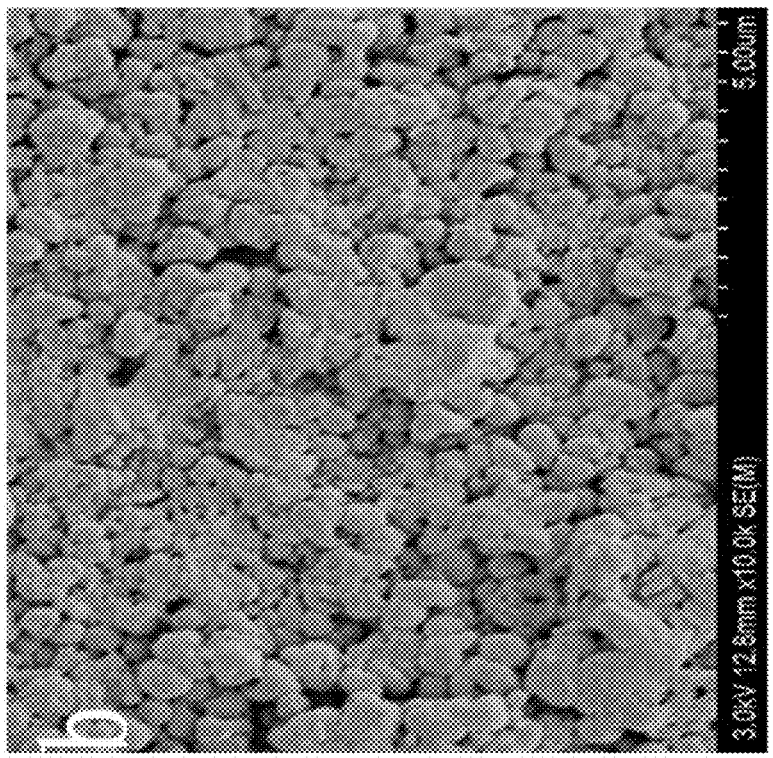
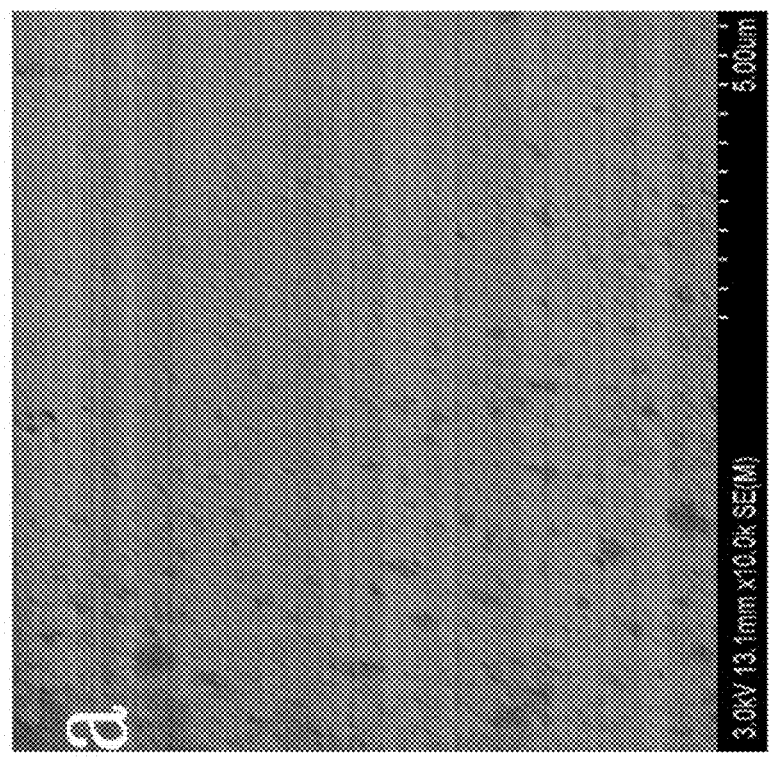

CONDUCTIVE SILK FIBROIN MATERIAL, AND PREPARATION METHOD AND USE THEREOF

This application is the National Stage Application of PCT/CN2020/080876, filed on Mar. 24, 2020, which claims priority to Chinese Patent Application No. 202010032403.X, filed on Jan. 13, 2020, which is incorporated by reference for all purposes as if fully set forth herein.

FIELD OF THE INVENTION

The present invention relates to the field of conductive materials, and in particular, to a conductive silk fibroin material, and preparation method and use thereof.

DESCRIPTION OF THE RELATED ART

Silk fibroin can be used as a material for biomedical applications and has great application potential, due to its excellent biocompatibility, high surface-to-weight ratio, good mechanical properties, good formability and slow biodegradability.

Compared with traditional conductive materials (inorganic semiconductor materials, metal materials), the newly developed conductive polymers have the characteristics of both polymer materials and conductive materials, and have better biocompatibility and flexibility. The modification of silk fibroin materials using conductive polymers has attracted the attention of many scholars.

As a novel functional material, conductive silk fibroin film has unique physical and chemical properties, and has certain intelligence because it can respond to specific external stimuli. Conductive silk fibroin film has potential application prospects in functional memory, sensors, electronic devices and other fields.

As the most widely studied conductive polymer, polypyrrole has been widely used in the modification of silk fibroin, including the modification of silk fibers and fabrics, and modifications using different polymerization methods such as the in-situ oxidative polymerization (Sun Donghao, Preparation and Characteristic of PPy/SF Conductive Composites [J]. Silk, 2009(04):22-25) and electrochemical polymerization (Nie Ming, Huang Feng, Wang Zhengao, Fu Rumin, Ning Chengyun, Electrochemical synthesis of polypyrrole/polydopamine for aluminum alloy corrosion inhibition [J], Acta Materiae Compositae Sinica, 2019, 36(10): 2364-2370) of regenerated silk fibroin materials.

The application of polyaniline as a conductive polymer has also been reported in the modification of wool, polyester and silk fibroin, including the in-situ oxidative polymerization (Li Xiaoru, Wet-spun Silk Fibroin/Polyaniline Conductive Flexible Filament [J], Journal of Textile Science and Engineering, 2019, 36(01):120-124+170) and electrochemical polymerization (Zhang Yue, Research on Fast Electropolymerization and Application of Polyaniline Nanofibers [D], Wuhan University of Technology, 2014) of polyester and wool fabrics and silk fibroin.

Poly(3,4-ethylenedioxythiophene), as one kind of polythiophene, is a novel conductive polymer. Due to its unique epoxy structure, it has high conductivity and excellent stability. For the compositing of poly(3,4-ethylenedioxythiophene) and fabrics such as silk, the physical dip coating method is currently reported mainly (Wang Dafeng, Preparation of conductive silk by adsorption polymerization and property research thereof [D], Suzhou University, 2010; Wang Dafeng, Xing Tieling, Chen Guoqiang, preparation of 3,4-ethylenedioxythiophene modified silk and conductivity thereof [J], Textile Auxiliaries, 2010, 27(07):13-15). However, at present, there is no method for modification of silk fibroin with poly(3,4-ethylenedioxythiophene) by in-situ chemical conductive polymer.

SUMMARY OF THE INVENTION

In order to solve the above technical problems, an object of the present invention is to provide a conductive silk fibroin material, and its preparation method and use. The present invention adopts an in-situ chemical modification method to allow for the in-situ polymerization of 3,4-ethylenedioxythiophene on the surface of the silk fibroin material under the action of manganese dioxide. The prepared conductive silk fibroin material has good conductivity and biocompatibility.

A method for preparing a conductive silk fibroin material according to the present invention comprises the following steps:

(1) preparation of insoluble silk fibroin material, including: uniformly mixing an aqueous silk fibroin solution and a low molecular monohydric alcohol and forming into a three-dimensional water-insoluble silk fibroin material, wherein in the aqueous silk fibroin solution, the concentration of silk fibroin is 30-70 mg/mL, the molecular weight of silk fibroin is 8000-14000 Da, and the weight ratio of silk fibroin to the low molecular monohydric alcohol is 100-1000:1;

(2) surface treatment of the silk fibroin material, including: immersing the silk fibroin material into an aqueous solution of a strong base with pH>14 to treat the silk fibroin material for 0.1-5 seconds, taking out and then immersing the silk fibroin material in an aqueous solution of 0.1-1 mol/L reductive weak acid and/or reductive weak acid salt to the silk fibroin material for 1-10 minutes;

(3) surface oxidation of the silk fibroin material, including: immersing the treated silk fibroin material of the step (2) in a 0.1-1 mol/L (preferably 0.3-0.6 mol/L) aqueous potassium permanganate solution to treat it at 15-30° C. for 10 minutes or less to obtain a surface-oxidized silk fibroin material;

(4) in-situ oxidative polymerization on the surface of the silk fibroin material, including: immersing the surface-oxidized silk fibroin material in an aqueous solution of a peroxide, and then adding 3,4-ethylenedioxythiophene and reacting at 20-30° C. to allow for polymerization of the 3,4-ethylenedioxythiophene occurs on the surface of the silk fibroin material, to obtain the conductive silk fibroin material after the reaction is complete.

Preferably, in the step (1), the low molecular monohydric alcohol is selected from the group consist of methanol, ethanol, propanol and any combination thereof.

Preferably, in the step (1), the aqueous silk fibroin solution contains high molecular silk fibroin, and is prepared by the following steps:

removing silkworm pupa from fresh silkworm cocoons, adding the cocoons to a $NaHCO_3/Na_2CO_3$ buffer with a pH of 9-9.5 at a bath ratio of 1:100, treating in a slightly boiling state for 30 minutes and washing, then repeating the above operations 3 times; then washing and drying to obtain degummed silk; dissolving the degummed silk in a 9.3 mol/L aqueous lithium bromide solution at 65±2° C. at a bath ratio of 15:100; after the resulting solution is sufficiently cooled, dialyzing against deionized water using a cellulose dialysis membrane (8000-14000 Da) for 3 days to obtain the aqueous silk fibroin solution.

Preferably, in the step (1), the three-dimensional water-insoluble silk fibroin material is formed by cast-molding in a mold at room temperature. Silk fibroin has a certain degree of plasticity and is not limited to a certain macroscopic shape, and therefore can theoretically be molded into any shape by changing the shape of the molding die.

Preferably, in the step (2), the strong base is sodium hydroxide and/or potassium hydroxide.

Preferably, in the step (2), the pH value of the aqueous solution of the reductive weak acid and/or the reductive weak acid salt is 4-6.

Preferably, in the step (2), the reductive weak acid is sulfurous acid and/or formic acid; and the reductive weak acid salt is sodium bisulfite and/or potassium bisulfite.

Preferably, in the step (4), the peroxide is selected from the group consisting of ammonium persulfate, sodium perborate, potassium perborate, sodium persulfate, potassium persulfate and any combination thereof, and the concentration of the aqueous solution of the peroxide is 0.1-0.5 mol/L.

Preferably, in the step (4), the concentration of the 3,4-ethylenedioxythiophene is 0.1-0.5 mol/L.

Preferably, in the step (1), the three-dimensional water-insoluble silk fibroin material is a planar film, and the conductive silk fibroin material prepared in the step (4) is also a planar film.

Preferably, in the step (4), the reaction is carried out for 1-10 h under shaking.

Preferably, in the step (4), after the reaction is completed, ultrasonically cleaning the obtained conductive silk fibroin material in deionized water for 1-5 minutes and drying at room temperature for 24 hours or more is further included.

The present invention further provides a conductive silk fibroin material prepared by the above preparation method, including a three-dimensional water-insoluble silk fibroin material and a conductive layer grafted to the surface of the silk fibroin material, wherein the conductive layer includes poly(3,4-ethylenedioxythiophene), and the sheet resistance of the conductive silk fibroin material is 100 to 5000 ohms.

Preferably, the conductive silk fibroin material is a planar film.

The present invention further discloses use of the conductive silk fibroin material prepared by the above method as a flexible electronic device.

Preferably, the flexible electronic device is configured to measure the blood glucose level and heartbeat of human.

In the present invention, taking a film-like conductive silk fibroin material as an example, the principle of preparation of the conductive silk fibroin material is as follows:

The water-insoluble silk fibroin film is formed by blending a small amount of monohydric alcohol and silk fibroin solution and plasticizing, and the silk fibroin film is activated with a strong base solution, and then immersed in a reductive weak acid and/or reductive weak acid salt to quickly remove alkaline substances such as sodium hydroxide on the surface of the silk fibroin membrane and form a reduced surface. The purpose of strong base activation is to destroy the crystalline layer on the surface of the silk fibroin film, so that reducing groups such as surface amino groups and hydroxyl groups are exposed on the surface of the silk fibroin film. Then the silk fibroin film is treated with a potassium permanganate solution so that potassium permanganate can oxidize the reducing groups such as amino groups and hydroxyl groups on the surface of the silk fibroin film. In this process, the potassium permanganate is reduced to manganese dioxide. The manganese dioxide binds to the surface of the silk fibroin film to form nano-catalytic particles. Subsequently, catalytic oxidation and grafting were carried out on the surface of the silk fibroin film. The oxidized silk fibroin film is placed in an aqueous solution of 3,4-ethylenedioxythiophene. Because 3.4-ethylenedioxythiophene loses electrons under the action of the peroxide oxidizing agent, cationic free radicals are formed. Oxygen and nitrogen atoms in the peptide bond (—CO—NH—) in the silk fibroin film are partially negatively charged, the free cations of the 3,4-ethylenedioxythiophene monomer will be attracted by the negatively charged macromolecules of the silk fibroin film and gather on the surface of the material under the action of electrostatic force. Thus, the monomer cations bound on the surface of the silk fibroin film by electrostatic force are used as active species. Under the catalysis of the manganese dioxide on the surface of the silk fibroin film, in-situ polymerization is initiated. Finally, poly(3.4-ethylenedioxythiophene) is formed through oxidative polymerization, thus forming a conductive layer.

By means of the above solution, the present invention has the following advantages.

Both silk fibroin and poly(3.4-ethylenedioxythiophene) have good biocompatibility, and the silk fibroin itself is degradable. Through the in-situ polymerization catalyzed by manganese dioxide, 3,4-ethylenedioxythiophene is polymerized in situ on the surface of the three-dimensional silk fibroin material, so that the composite material has excellent conductivity.

The conductive silk fibroin material of the present invention is soft and has excellent biocompatibility and conductivity, and thus it is a desirable flexible biological conductive material and can be used as a material for measuring the blood glucose level and heartbeat of human.

The above description is only a summary of the technical solutions of the present invention. To make the technical means of the present invention clearer and implementable in accordance with the disclosure of the specification, the preferred embodiments of the present invention will be described in detail with reference to the accompanying drawings.

BRIEF DESCRIPTION OF THE DRAWINGS

FIG. 1 is a scanning electron micrograph of a silk fibroin film of the present invention before and after treatment.

DETAILED DESCRIPTION OF THE PREFERRED EMBODIMENTS

The detailed description of the present invention will be described in further detail with reference to the accompanying drawings and specific embodiments. The following embodiments are intended to illustrate the present invention, instead of limiting the scope of the present invention.

Unless otherwise specifically stated, in the present invention, "insoluble silk fibroin film" refers to "water-insoluble silk fibroin film".

Example 1

Preparation of silk fibroin film: after removing the silkworm pupa, the fresh silkworm cocoons were added to a $NaHCO_3/Na_2CO_3$ buffer with a pH of 9-9.5 at a bath ratio of 1:100. The solution was heated to a slightly boiling state, and the silkworm cocoons were treated for 30 minutes and washed with deionized water. Then the above operations were repeated 3 times. After fully washing, the silk was pulled apart and flattened, and dried in an oven at 60° C. The degummed silk was dissolved in a 9.3 mol/L lithium bromide solution at 65±2° C. at a bath ratio of 15:100. The resulting solution, after being sufficiently cooled, was dialyzed against deionized water using a cellulose dialysis membrane (8000-14000 Da) for 3 days to obtain a high-molecular-weight aqueous silk fibroin solution.

The concentration of the high-molecular-weight aqueous silk fibroin solution was adjusted to 50 mg/mL. Ethanol was added to the adjusted solution at a weight ratio of ethanol to silk fibroin of 1:100, followed by uniform mixing. The resulting mixture was poured into a mold and formed a film at room temperature, to obtain an insoluble silk fibroin film.

The insoluble silk fibroin film was immersed in an aqueous sodium hydroxide solution with a concentration of 5 mol/L and treated for 1 second, and then the silk fibroin film was taken out. Subsequently the silk fibroin film was immersed in a 0.5 mol/L aqueous sodium bisulfite solution and treated for 3 minutes, finally the silk fibroin film was taken out and rinsed with deionized water 3 times.

The surface-treated silk fibroin film was immersed in a 0.5 mol/L aqueous potassium permanganate solution at room temperature and treated for 1 minute. The surface-oxidized silk fibroin film was immersed in an aqueous ammonium persulfate solution with a concentration of 0.2 mol/L, 3,4-ethylenedioxythiophene was added to give a concentration of 0.3 mol/L, and the reaction was shaken at 25° C. for 6 hours. After the reaction, the silk fibroin film was taken out and rinsed with deionized water, then vibrated for 2 minutes in an ultrasonic cleaner, and then the silk fibroin film was taken out and dried at room temperature for 24 hours or more to obtain a conductive silk fibroin film with a resistance of 3800 ohms.

Example 2

Preparation of silk fibroin film: after removing the silkworm pupa, the fresh silkworm cocoons were added to a $NaHCO_3/Na_2CO_3$ buffer with a pH of 9-9.5 at a bath ratio of 1:100. The solution was heated to a slightly boiling state, and the silkworm cocoons were treated for 30 minutes and washed with deionized water. Then the above operations were repeated 3 times. After fully washing, the silk was pulled apart and flattened, and dried in an oven at 60° C. The degummed silk was dissolved in a 9.3 mol/L lithium bromide solution at 65±2° C. at a bath ratio of 15:100. The resulting solution, after being sufficiently cooled, was dialyzed against deionized water using a cellulose dialysis membrane (8000-14000 Da) for 3 days to obtain a high-molecular-weight aqueous silk fibroin solution.

The concentration of the high-molecular-weight aqueous silk fibroin solution was adjusted to 50 mg/mL. Methanol was added to the adjusted solution at a weight ratio of methanol to silk fibroin of 1:500, followed by uniform mixing. The resulting mixture was poured into a mold and formed a film at room temperature, to obtain an insoluble silk fibroin film.

The insoluble silk fibroin film was immersed in an aqueous sodium hydroxide solution with a concentration of 6 mol/L and treated for 2 seconds, and then the silk fibroin film was taken out. Subsequently the silk fibroin film was immersed in a 0.5 mol/L aqueous sodium bisulfite solution and treated for 3 minutes, finally the silk fibroin film was taken out and rinsed with deionized water 3 times.

The surface-treated silk fibroin film was immersed in a 0.5 mol/L aqueous potassium permanganate solution at room temperature and treated for 1 minute. The surface-oxidized silk fibroin film was immersed in an aqueous ammonium persulfate solution with a concentration of 0.2 mol/L, 3,4-ethylenedioxythiophene was added to give a concentration of 0.3 mol/L, and the reaction was shaken at 25° C. for 6 hours. After the reaction, the silk fibroin film was taken out and rinsed with deionized water, then vibrated for 2 minutes in an ultrasonic cleaner, and then the silk fibroin film was taken out and dried at room temperature for 24 hours or more to obtain a conductive silk fibroin film with a resistance of 3500 ohms.

Example 3

Preparation of silk fibroin film: after removing the silkworm pupa, the fresh silkworm cocoons were added to a $NaHCO_3/Na_2CO_3$ buffer with a pH of 9-9.5 at a bath ratio of 1:100. The solution was heated to a slightly boiling state, and the silkworm cocoons were treated for 30 minutes and washed with deionized water. Then the above operations were repeated 3 times. After fully washing, the silk was pulled apart and flattened, and dried in an oven at 60° C. The degummed silk was dissolved in a 9.3 mol/L lithium bromide solution at 65±2° C. at a bath ratio of 15:100. The resulting solution, after being sufficiently cooled, was dialyzed against deionized water using a cellulose dialysis membrane (8000-14000 Da) for 3 days to obtain a high-molecular-weight aqueous silk fibroin solution.

The concentration of the high-molecular-weight aqueous silk fibroin solution was adjusted to 50 mg/mL. Methanol was added to the adjusted solution at a weight ratio of methanol to silk fibroin of 1:600, followed by uniform mixing. The resulting mixture was poured into a mold and formed a film at room temperature, to obtain an insoluble silk fibroin film.

The insoluble silk fibroin film was immersed in an aqueous sodium hydroxide solution with a concentration of 5 mol/L and treated for 1 second, and then the silk fibroin film was taken out. Subsequently the silk fibroin film was immersed in a 0.5 mol/L aqueous sodium bisulfite solution and treated for 3 minutes, finally the silk fibroin film was taken out and rinsed with deionized water 3 times.

The surface-treated silk fibroin film was immersed in a 0.4 mol/L aqueous potassium permanganate solution at room temperature and treated for 1 minute. The surface-oxidized silk fibroin film was immersed in an aqueous potassium persulfate solution with a concentration of 0.2 mol/L, 3,4-ethylenedioxythiophene was added to give a concentration of 0.2 mol/L, and the reaction was shaken at 25° C. for 3 hours. After the reaction, the silk fibroin film was taken out and rinsed with deionized water, then vibrated for 2 minutes in an ultrasonic cleaner, and then the silk fibroin film was taken out and dried at room temperature for 24 hours or more to obtain a conductive silk fibroin film with a resistance of 3000 ohms.

Example 4

Preparation of silk fibroin film: after removing the silkworm pupa, the fresh silkworm cocoons were added to a $NaHCO_3/Na_2CO_3$ buffer with a pH of 9-9.5 at a bath ratio of 1:100. The solution was heated to a slightly boiling state, and the silkworm cocoons were treated for 30 minutes, and washed with deionized water. Then the above operations were repeated 3 times. After fully washing, the silk was pulled apart and flattened, and dried in an oven at 60° C. The degummed silk was dissolved in a 9.3 mol/L lithium bromide solution at 65±2° C. at a bath ratio of 15:100. The resulting solution, after being sufficiently cooled, was dialyzed against deionized water using a cellulose dialysis membrane (8000-14000 Da) for 3 days to obtain a high-molecular-weight aqueous silk fibroin solution.

The concentration of the high-molecular-weight aqueous silk fibroin solution was adjusted to 30 mg/mL. Propanol was added to the adjusted solution at a weight ratio of propanol to silk fibroin of 1:100, followed by uniform mixing. The resulting mixture was poured into a mold and formed a film at room temperature, to obtain an insoluble silk fibroin film.

The insoluble silk fibroin film was immersed in an aqueous sodium hydroxide solution with a concentration of 5 mol/L and treated for 2 seconds, and then the silk fibroin film was taken out. Subsequently the silk fibroin film was immersed in a 0.1 mol/L aqueous formic acid solution and treated for 3 minutes, finally the silk fibroin film was taken out and rinsed with deionized water 3 times.

The surface-treated silk fibroin film was immersed in a 0.6 mol/L aqueous potassium permanganate solution at room temperature and treated for 1 minute. The surface-oxidized silk fibroin film was immersed in an aqueous ammonium persulfate solution with a concentration of 0.2 mol/L, 3,4-ethylenedioxythiophene was added to give a concentration of 0.3 mol/L, and the reaction was shaken at 25° C. for 3 hours. After the reaction, the silk fibroin film was taken out and rinsed with deionized water, then vibrated for 2 minutes in an ultrasonic cleaner, and then the silk fibroin film was taken out and dried at room temperature for 24 hours or more to obtain a conductive silk fibroin film with a resistance of 4300 ohms.

Example 5

Preparation of silk fibroin film: after removing the silkworm pupa, the fresh silkworm cocoons were added to a $NaHCO_3/Na_2CO_3$ buffer with a pH of 9-9.5 at a bath ratio of 1:100. The solution was heated to a slightly boiling state, treated for 30 minutes, and washed with deionized water. Then the above operations were repeated 3 times. After fully washing, the silk was pulled apart and flattened, and dried in an oven at 60° C. The degummed silk was dissolved in a 9.3 mol/L lithium bromide solution at 65±2° C. at a bath ratio of 15:100. The resulting solution, after being sufficiently cooled, was dialyzed against deionized water using a cellulose dialysis membrane (8000-14000 Da) for 3 days to obtain a high-molecular-weight aqueous silk fibroin solution.

The concentration of the high-molecular-weight aqueous silk fibroin solution was adjusted to 60 mg/mL. Methanol was added to the adjusted solution at a weight ratio of methanol to silk fibroin of 1:1000, followed by uniform mixing. The resulting mixture was poured into a mold and formed a film at room temperature, to obtain an insoluble silk fibroin film.

The insoluble silk fibroin film was immersed in an aqueous sodium hydroxide solution with a concentration of 5 mol/L and treated for 1 second, and then the silk fibroin film was taken out. Subsequently the silk fibroin film was immersed in a 1 mol/L aqueous sodium bisulfite solution and treated for 3 minutes, and finally the silk fibroin film was taken out and rinsed with deionized water 3 times.

The surface-treated silk fibroin film was immersed in a 0.5 mol/L aqueous potassium permanganate solution at room temperature and treated for 1 minute. The surface-oxidized silk fibroin film was immersed in an aqueous ammonium persulfate solution with a concentration of 0.2 mol/L, 3,4-ethylenedioxythiophene was added to give a concentration of 0.3 mol/L, and the reaction was shaken at 25° C. for 3 hours. After the reaction, the silk fibroin film was taken out and rinsed with deionized water, then vibrated for 2 minutes in an ultrasonic cleaner, and then the silk fibroin film was taken out and dried at room temperature for 24 hours or more to obtain a conductive silk fibroin film with a resistance of 3500 ohms.

Example 6

Preparation of silk fibroin film: after removing the silkworm pupa, the fresh silkworm cocoons were added to a $NaHCO_3/Na_2CO_3$ buffer with a pH of 9-9.5 at a bath ratio of 1:100. The solution was heated to a slightly boiling state, and the silkworm cocoons were treated for 30 minutes, and washed with deionized water. Then the above operations were repeated 3 times. After fully washing, the silk was pulled apart and flattened, and dried in an oven at 60° C. The degummed silk was dissolved in a 9.3 mol/L lithium bromide solution at 65±2° C. at a bath ratio of 15:100. The resulting solution, after being sufficiently cooled, was dialyzed against deionized water using a cellulose dialysis membrane (8000-14000 Da) for 3 days to obtain a high-molecular-weight aqueous silk fibroin solution.

The concentration of the high-molecular-weight aqueous silk fibroin solution was adjusted to 30 mg/mL. Isopropanol was added to the adjusted solution at a weight ratio of isopropanol to silk fibroin of 1:100, followed by uniform mixing. The resulting mixture was poured into a mold and formed a film at room temperature, to obtain an insoluble silk fibroin film.

The insoluble silk fibroin film was immersed in an aqueous sodium hydroxide solution with a concentration of 5 mol/L and treated for 0.5 second, and then the silk fibroin film was taken out. Subsequently the silk fibroin film was immersed in a 1 mol/L aqueous sodium bisulfite solution and treated for 4 minutes, finally the silk fibroin film was taken out and rinsed with deionized water 3 times.

The surface-treated silk fibroin film was immersed in a 0.2 mol/L aqueous potassium permanganate solution at room temperature and treated for 1 minute. The surface-oxidized silk fibroin film was immersed in an aqueous sodium persulfate solution with a concentration of 0.2 mol/L, 3,4-ethylenedioxythiophene was added to give a concentration of 0.3 mol/L, and the reaction was shaken at 25° C. for 3 hours. After the reaction, the silk fibroin film was taken out and rinsed with deionized water, then vibrated for 2 minutes in an ultrasonic cleaner, and then the silk fibroin was taken out and dried at room temperature for 24 hours or more to obtain a conductive silk fibroin film with a resistance of 9800 ohms.

Example 7

Preparation of silk fibroin film: after removing the silkworm pupa, the fresh silkworm cocoons were added to a $NaHCO_3/Na_2CO_3$ buffer with a pH of 9-9.5 at a bath ratio of 1:100. The solution was heated to a slightly boiling state, and the silkworm cocoons were treated for 30 minutes and washed with deionized water. Then the above operations were repeated 3 times. After fully washing, the silk was pulled apart and flattened, and dried in an oven at 60° C. The degummed silk was dissolved in a 9.3 mol/L lithium bromide solution at 65±2° C. at a bath ratio of 15:100. The resulting solution, after being sufficiently cooled, was dialyzed against deionized water using a cellulose dialysis membrane (8000-14000 Da) for 3 days to obtain a high-molecular-weight aqueous silk fibroin solution.

The concentration of the high-molecular-weight aqueous silk fibroin solution was adjusted to 40 mg/mL. Methanol was added to the adjusted solution at a weight ratio of methanol to silk fibroin of 1:800, followed by uniform mixing. The resulting mixture was poured into a mold and formed a film at room temperature, to obtain an insoluble silk fibroin film.

The insoluble silk fibroin film was immersed in an aqueous sodium hydroxide solution with a concentration of 5 mol/L and treated for 3 seconds, and then the silk fibroin film was taken out. Subsequently the silk fibroin film was immersed in a 0.7 mol/L aqueous sodium bisulfite solution and treated for 4 minutes, finally the silk fibroin film was taken out and rinsed with deionized water 3 times.

The surface-treated silk fibroin film was immersed in a 0.5 mol/L aqueous potassium permanganate solution at room temperature and treated for 45 seconds. The surface-oxidized silk fibroin film was immersed in an aqueous sodium perborate solution with a concentration of 0.2 mol/L, 3,4-ethylenedioxythiophene was added to give a concentration of 0.3 mol/L, and the reaction was shaken at 25° C. for 3 hours. After the reaction, the silk fibroin film was taken out and rinsed with deionized water, then vibrated for 2 minutes in an ultrasonic cleaner, and then the silk fibroin film was taken out and dried at room temperature for 24 hours or more to obtain a conductive silk fibroin film with a resistance of 1500 ohms.

Example 8

Preparation of silk fibroin film: after removing the silkworm pupa, the fresh silkworm cocoons were added to a $NaHCO_3/Na_2CO_3$ buffer with a pH of 9-9.5 at a bath ratio of 1:100. The solution was heated to a slightly boiling state, and the silkworm cocoons were treated for 30 minutes and washed with deionized water. Then the above operations were repeated 3 times. After fully washing, the silk was pulled apart and flattened, and dried in an oven at 60° C. The degummed silk was dissolved in a 9.3 mol/L lithium bromide solution at 65±2° C. at a bath ratio of 15:100. The resulting solution, after being sufficiently cooled, was dialyzed against deionized water using a cellulose dialysis membrane (8000-14000 Da) for 3 days to obtain a high-molecular-weight aqueous silk fibroin solution.

The concentration of the high-molecular-weight aqueous silk fibroin solution was adjusted to 45 mg/mL. Methanol was added to the adjusted solution at a weight ratio of methanol to silk fibroin of 1:900, followed by uniform mixing. The resulting mixture was poured into a mold and formed a film at room temperature, to obtain an insoluble silk fibroin film.

The insoluble silk fibroin film was immersed in an aqueous sodium hydroxide solution with a concentration of 5 mol/L and treated for 1 second, and then the silk fibroin film was taken out. Subsequently the silk fibroin film was immersed in a 1 mol/L aqueous sulfurous acid solution and treated for 3 minutes, finally the silk fibroin film was taken out and rinsed with deionized water 3 times.

The surface-treated silk fibroin film was immersed in a 1 mol/L aqueous potassium permanganate solution at room temperature and treated for 30 seconds. The surface-oxidized silk fibroin film was immersed in an aqueous ammonium persulfate solution with a concentration of 0.2 mol/L, 3,4-ethylenedioxythiophene was added to give a concentration of 0.3 mol/L, and the reaction was shaken at 25° C. for 3 hours. After the reaction, the silk fibroin film was taken out and rinsed with deionized water, then vibrated for 2 minutes in an ultrasonic cleaner, and then the silk fibroin film was taken out and dried at room temperature for 24 hours or more to obtain a conductive silk fibroin film with a resistance of 720 ohms.

Example 9

Preparation of silk fibroin film: after removing the silkworm pupa, the fresh silkworm cocoons were added to a $NaHCO_3/Na_2CO_3$ buffer with a pH of 9-9.5 at a bath ratio of 1:100. The solution was heated to a slightly boiling state, and the silkworm cocoons were treated for 30 minutes, and washed with deionized water. Then the above operations were repeated 3 times. After fully washing, the silk was pulled apart and flattened, and dried in an oven at 60° C. The degummed silk was dissolved in a 9.3 mol/L lithium bromide solution at 65±2° C. at a bath ratio of 15:100. The resulting solution, after being sufficiently cooled, was dialyzed against deionized water using a cellulose dialysis membrane (8000-14000 Da) for 3 days to obtain a high-molecular-weight aqueous silk fibroin solution.

The concentration of the high-molecular-weight aqueous silk fibroin solution was adjusted to 50 mg/mL. Methanol was added to the adjusted solution at a weight ratio of methanol to silk fibroin of 1:700, followed by uniform mixing. The resulting mixture was poured into a mold and formed a film at room temperature, to obtain an insoluble silk fibroin film.

The insoluble silk fibroin film was immersed in an aqueous sodium hydroxide solution with a concentration of 4 mol/L and treated for 4 seconds, and then the silk fibroin film was taken out. Subsequently the silk fibroin film was immersed in a 0.85 mol/L aqueous potassium bisulfite solution and treated for 4 minutes, finally the silk fibroin film was taken out and rinsed with deionized water 3 times.

The surface-treated silk fibroin film was immersed in a 0.8 mol/L aqueous potassium permanganate solution at room temperature and treated for 30 seconds. The surface-oxidized silk fibroin film was immersed in an aqueous potassium perborate solution with a concentration of 0.2 mol/L, 3,4-ethylenedioxythiophene was added to give a concentration of 0.3 mol/L, and the reaction was shaken at 25° C. for 4 hours. After the reaction, the silk fibroin film was taken out and rinsed with deionized water, then vibrated for 2 minutes in an ultrasonic cleaner, and then the silk fibroin film was taken out and dried at room temperature for 24 hours or more to obtain a conductive silk fibroin film with a resistance of 4200 ohms.

Example 10

Preparation of silk fibroin film: after removing the silkworm pupa, the fresh silkworm cocoons were added to a $NaHCO_3/Na_2CO_3$ buffer with a pH of 9-9.5 at a bath ratio of 1:100. The solution was heated to a slightly boiling state, and the silkworm cocoons were treated for 30 minutes and washed with deionized water. Then the above operations were repeated 3 times. After fully washing, the silk was pulled apart and flattened, and dried in an oven at 60° C. The degummed silk was dissolved in a 9.3 mol/L lithium bromide solution at 65±2° C. at a bath ratio of 15:100. The resulting solution, after being sufficiently cooled, was dialyzed against deionized water using a cellulose dialysis membrane (8000-14000 Da) for 3 days to obtain a high-molecular-weight aqueous silk fibroin solution.

The concentration of the high-molecular-weight aqueous silk fibroin solution was adjusted to 35 mg/mL. Methanol was added to the adjusted solution at a weight ratio of methanol to silk fibroin of 1:300, followed by uniform mixing. The resulting mixture was poured into a mold and formed a film at room temperature, to obtain an insoluble silk fibroin film.

The insoluble silk fibroin film was immersed in an aqueous sodium hydroxide solution with a concentration of 7 mol/L and treated for 0.5 second, and then the silk fibroin film was taken out. Subsequently the silk fibroin film was immersed in a 1 mol/L aqueous potassium bisulfite solution and treated for 3 minutes, finally the silk fibroin film was taken out and rinsed with deionized water 3 times.

The surface-treated silk fibroin film was immersed in a 1 mol/L aqueous potassium permanganate solution at room temperature and treated for 30 seconds. The surface-oxidized silk fibroin film was immersed in an aqueous ammonium persulfate solution with a concentration of 0.2 mol/L, 3,4-ethylenedioxythiophene was added to give a concentration of 0.2 mol/L, and the reaction was shaken at 25° C. for 5 hours. After the reaction, the silk fibroin film was taken out and rinsed with deionized water, then vibrated for 2 minutes in an ultrasonic cleaner, and then the silk fibroin film was taken out and dried at room temperature for 24 hours or more to obtain a conductive silk fibroin film with a resistance of 1200 ohms.

The results of the sheet resistance of the conductive silk fibroin films prepared in the above examples are summarized in Table 1.

TABLE 1

Sheet resistances of different conductive silk fibroin films

| Examples | Sheet resistance |
| --- | --- |
| Example 1 | 3800 ohms |
| Example 2 | 3500 ohms |
| Example 3 | 3000 ohms |
| Example 4 | 4300 ohms |
| Example 5 | 3500 ohms |
| Example 6 | 9800 ohms |
| Example 7 | 1500 ohms |
| Example 8 | 720 ohms |
| Example 9 | 4200 ohms |
| Example 10 | 1200 ohms |

FIG. 1 is a scanning electron micrograph of a silk fibroin film before and after treatment according to Example 1 of the present invention, wherein FIG. 1a shows a smooth surface before treatment; and FIG. 1b shows that a conductive layer was deposited on the surface after treatment with 3,4-ethylenedioxythiophene.

While preferred embodiments of the present invention have been described above, the present invention is not limited thereto. It should be appreciated that some improvements and variations can be made by those skilled in the art without departing from the technical principles of the present invention, which are also contemplated to be within the scope of the present invention.

What is claimed is:

1. A method for preparing a conductive silk fibroin material, comprising steps of:
   (1) uniformly mixing an aqueous silk fibroin solution and a low molecular monohydric alcohol and forming into a three-dimensional water-insoluble silk fibroin material, wherein in the aqueous silk fibroin solution, the concentration of silk fibroin is 30-70 mg/mL, the molecular weight of silk fibroin is 8000-14000 Da, and the weight ratio of silk fibroin to the low molecular monohydric alcohol is 100-1000:1;
   (2) immersing the silk fibroin material into an aqueous solution of a strong base with pH>14 to treat the silk fibroin material for 0.1-5 seconds, taking out and immersing the silk fibroin material in an aqueous solution of 0.1-1 mol/L reductive weak acid and/or reductive weak acid salt to treat the silk fibroin material for 1-10 minutes;
   (3) immersing the treated silk fibroin material of the step (2) in a 0.1-1 mol/L aqueous potassium permanganate solution to treat it at 15-30° C. for 10 minutes or less to obtain a surface-oxidized silk fibroin material; and
   (4) immersing the surface-oxidized silk fibroin material in a peroxide aqueous solution and then adding 3,4-ethylenedioxythiophene and reacting at 20-30° C. to allow for polymerization of 3,4-ethylenedioxythiophene on the surface of the silk fibroin material, to obtain the conductive silk fibroin material after the reaction is completed.

2. The method according to claim 1, wherein in the step (1), the low molecular monohydric alcohol is selected from the group consisting of methanol, ethanol propanol and any combination thereof.

3. The method according to claim 1, wherein in the step (2), the strong base is sodium hydroxide and/or potassium hydroxide.

4. The method according to claim 1, wherein in the step (2), the pH value of the aqueous solution of the reductive weak acid or the reductive weak acid salt is 4-6.

5. The method according to claim 1, wherein in the step (2), the reductive weak acid is sulfurous acid and/or formic acid; and the reductive weak acid salt is sodium bisulfite and/or potassium bisulfite.

6. The method according to claim 1, wherein in the step (4), the peroxide is selected from the group consisting of ammonium persulfate, sodium perborate, potassium perborate, sodium persulfate and potassium persulfate and any combination thereof, and the concentration of the aqueous solution of the peroxide is 0.1-0.5 mol/L.

7. The method according to claim 1, wherein in the step (4), the concentration of 3,4-ethylenedioxythiophene is 0.1-0.5 mol/L.

8. The method according to claim 1, wherein in the step (1), the three-dimensional water-insoluble silk fibroin material is a planar film.

* * * * *